United States Patent [19]

Ahrens et al.

[11] 3,862,126

[45] Jan. 21, 1975

[54] 1,3,-DI-(ISOPROPYLIDENEAMINOOX-YCARBONYL) BENZINDAZOLE CARBAMATES

[75] Inventors: Dietrich Ahrens, Gross Flothe; Kurt Röder; Ernst Albrecht Pieroh, both of Berlin, all of Germany

[73] Assignees: Scherings Ag, Berlin; Scherings AG, Bergkamen, both of, Germany

[22] Filed: Apr. 19, 1972

[21] Appl. No.: 245,644

[30] Foreign Application Priority Data

May 5, 1971 Germany.............................. 2123015

[52] U.S. Cl............ 260/309.2, 260/240 G, 424/273
[51] Int. Cl............................................. C07d 49/38
[58] Field of Search................................... 260/309.2

[56] References Cited
UNITED STATES PATENTS

| 3,541,213 | 11/1970 | Klopping | 260/309.2 |
| 3,641,048 | 2/1972 | Dittmar | 260/309.2 |

*Primary Examiner*—Natalie Trousof
*Attorney, Agent, or Firm*—Joseph F. Padlon

[57] ABSTRACT

1-Alkylideneaminooxycarbonyl -2-alkyl or alkenylcarbonylimino-benzimidazoles or derivatives thereof such as those in which the 3-position is substituted with a carbamyl group, a carboxylic ester group or an alkylideneaminooxycarbonyl group are made and used as fungicidal agents.

6 Claims, No Drawings

1,3-DI-(ISOPROPYLIDENEAMINOOXYCARBONYL) BENZINDAZOLE CARBAMATES

The invention relates to new substituted benzimidazole carbamates, fungicidal agents containing these compounds as active substances, as well as processes for the production of these compounds.

The fungicidal action of benzimidazole derivatives is known. One of their most important representatives is the compound already introduced in the practice for the control of phytopathogenic noxious fungi, methyl-1-(butylcarbamoyl)-2-benzimidazole carbamate (cf. French Patent No. 1,523,359). While this active substance exhibits a wide spectrum of action, it does not always meet the stipulated requirements, especially with respect to the control of noxious fungi in certain crop cultivations.

It has now been found that compounds of the general formula

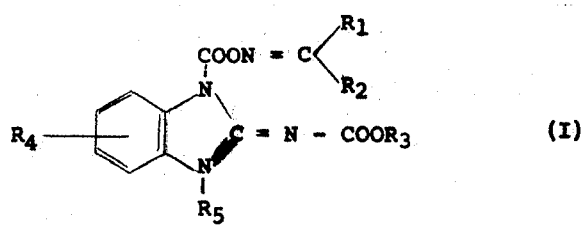

wherein
$R_1$ and $R_2$ are the same or different and represent a possibly mono- or multi-substituted aromatic, aliphatic, or cycloaliphatic hydrocarbon radical;
$R_1$ is hydrogen in addition to the aforesaid meaning;
$R_3$ is an aliphatic hydrocarbon radical;
$R_4$ is hydrogen, alkyl, halogen alkyl, alkoxy, halogen, or the nitro group; and
$R_5$ is hydrogen or the radicals

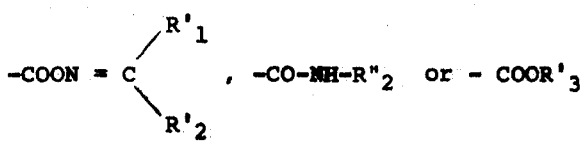

—CO—NH—R''$_2$ or — COOR'$_3$
with R'$_1$, R'$_2$ and R'$_3$ in the meaning of $R_1$, $R_2$ or $R_3$ respectively, have fungicidal effect and can be used in particular for the control of phytopathogenic noxious fungi on useful plants.

In particular there should be mentioned such compounds where in the designated general formula $R_1$ and $R_2$ represent a methyl radical, $R_3$ an aliphatic hydrocarbon radical with 1 to 4 carbon atoms, $R_4$ hydrogen, methyl, methoxy, chlorine or the nitro group, $R_5$ hydrogen or the radicals —COON = C(CH$_3$)$_2$, —CO—NH—R''$_2$ or —COOR'$_3$ with R''$_2$ and R'$_3$ in the meaning of an aliphatic hydrocarbon radical with 1 to 4 carbon atoms.

Other compounds within the scope of the invention are those of the formula

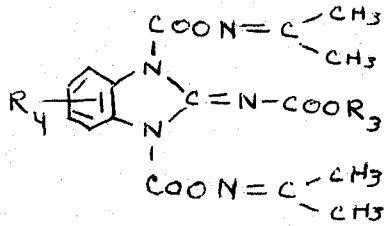

wherein $R_3$ is methyl, ethyl or allyl and $R_4$ is hydrogen, lower alkoxy, lower alkyl, halo or nitro.

The compounds according to the invention possess eminent fungicidal properties. Thus they show a good fungicidal action against numerous noxious fungi, as for example Rhizoctonia, Fusarium, true mildew fungi, Piricularia, Botrytis, Fusicladium, etc.

As the compounds are practically nontoxic and excellently tolerated by fruits and plants, they can be employed in viticulture, horticulture and the growing of ornamental plants as well as in numerous crop cultures, such as cotton, rice and the like.

Some of the compounds according to the invention show, surprisingly, an activity superior to the active substance of analogous constitution, known in the practice, against noxious fungi in important crop cultures, as for example Rhizoctonia solani on cotton.

The compounds according to the invention have the special advantage of being not only prophylactic but also curative, so that noxious fungi already established, such as Erysiphaceae, Venturia and Piricularia, cannot develop further.

Moreover, these compounds display a systemic effect, in that they are transported in the sap stream of the plants to the site of their action. The absorption of the compounds occurs not only through the leaves, but also from the soil through the roots.

According to present findings, particularly 1-isopropylideneaminooxycarbonyl-2-(methoxycarbonylamino)-benzimidazole, 1-isopropylideneaminooxycarbonyl-3-butyl-carbamoyl-2-(methoxycarbonylimino)-benzimidazole, 1-isopropylideneaminooxy-carbonyl-2-(isopropoxycarbonylamino)-benzimidazole, 1-isopropylidenaminooxycarbonyl-2-(ethoxycarbonylamino)-benzimidazole and 1-isopropylideneaminooxycarbonyl-3-butylcarbamoyl-2-(ethoxycarbonylimino)-benzimidazole have shown excellent fungicidal effects.

The compounds according to the invention can therefore be used as sprays or as disinfectants in agriculture, as well as in horticulture for the fungicidal treatment of infected or infection threatened plants and soils or for the protection of seeds.

The application can take place either with the single specific active substance alone or with the mixtures of at least two different active substances. If desired, other fungicides, nematocides, herbicides or other pest control agents, depending on the desired purpose, may be added. Appropriately, the active substances are employed in the form of the following preparations, namely, powders, scatters, granulations, solvents, emulsions or suspensions, with the addition of liquid and/or solid vehicles or diluents and also of wetting, adhesive, emulsifying and/or dispersing aids.

Suitable liquid vehicles used in the invention are water, mineral oils or organic solvents, such as xylene, chlorobenzene, cyclohexanol, cyclohexanone, dioxane, acetonitrile, acetic ester, dimethyl formamide, isophorone, dimethylsulfoxide, and the like. As solid vehicles that are suitable for use are lime, kaolin, chalk, talc, attaclay and other clays as well as natural or synthetic silicic acid.

Among the surface-active substances that may be used are salts of the lignin-sulfonic acids, salts of alkylated benzenesulfonic acids, sulfonated acid amides and their salts, polyethoxylated amines and alcohols.

If the active substances are to be used for seed disinfection, dyes may be admixed with them, so as to give the disinfected seed material a clearly visible coloration.

The proportion of active ingredient or ingredients in the agent may vary within wide limits, the exact concentration of the active substance to be used for the agent depending mainly on the quantity in which the agents are to be used for the soil or seed treatment. The agents contain between about 1 and 80 percent by weight, preferably between about 20 and 50 percent by weight of active substance and approximately 99 to 20 percent by weight of liquid or solid vehicles as well as possibly up to 20 percent by weight of surface-active substances.

The new active substances of the general formula I can be produced, for example, by reacting either compounds of the general formula

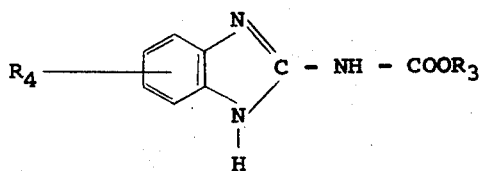

a. with cloroformyl oximes of the general formula

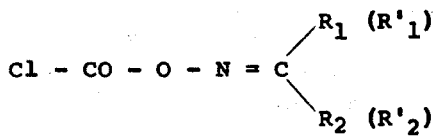

in equimolar or in bimolar weight ratios in the presence of a diluent and of an acid acceptor,
or
b. first with chloroformyl oximes in equimolar weight ratios and then allowing them to react with chloroformic acid esters of the general formula

in the presence of a diluent and of an acid acceptor or with carbamic acid chlorides of the general formula

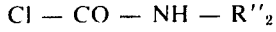

in the presence of a diluent and of an acid acceptor or with isocyanates of the general formula

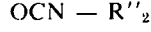

in the presence of a diluent,
or
c. by first exposing them to phosgene and then allowing the formed chloroformyl benzimidazoles of the general formula

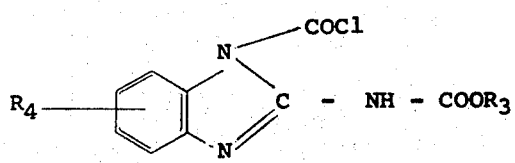

to react with oximes of the general formula

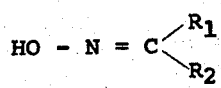

or their alkali salts and allowing the reaction products, if desired, to react with chloroformic acid esters of the general formula

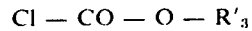

or
with carbamic acid chlorides of the general formula

in the presence of a diluent and of an acid acceptor
or
with isocyanates of the general formula

in the presence of a diluent
or
by first reacting compounds of the general formula

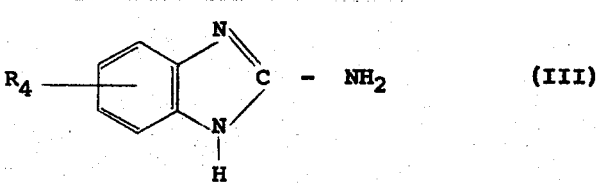

with chloroformyl oximes of the general formula

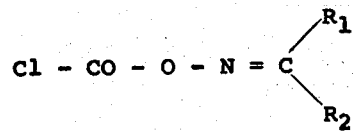

in equimolar weight ratios in the presence of a diluent and of an acid acceptor and then allowing them to react the chloroformic acid esters of the general formula Cl — CO — O — R$_3$ in equimolar weight ratios in the presence of a diluent and of an acid acceptor, whereupon the reaction products are, if desired, reacted with equimolar proportions of a chloroformyl oxime of the general formula

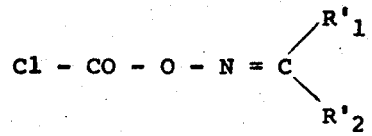

of a chloroformic acid ester of the general formula

Cl — CO — O — R''$_3$, of a carbamic acid chloride of the general formula

Cl — CO — NH — R''$_2$ of an isocyanate of the general formula

OCN — R''$_2$, wherein R$_1$, R$_2$, R$_3$, R$_4$, R'$_1$, R'$_2$, R''$_2$ and R'$_3$ have the above meaning.

The production of the compounds of the invention according to the methods (a) and (b) is carried out appropriately in an inert organic solvent, as acetone, chloroform, benzene, tetrahydrofurane or methylene chloride, in the presence of an acid acceptor, as triethylamine, pyridine, or a substance of alkaline reaction, such as alkali carbonate or alkali hydrogen carbonate.

According to method (c), first benzimidazole-2-carbamate is treated with phosgene in an inert organic solvent, such as benzene, toluene, or tetrahydrofurane, and then an equimolar quantity of a tertiary amine, such as triethylamine, is added. After filtration and vacuum distillation the resulting 1-chlorocarbonyl-benzimidazole-2-carbamate is either isolated by treating with a hydrocarbon, such as hexane, or reacted in the same inert or another inert organic solvent either in the presence of the stoichiometric quantity of a tertiary amine or of an alkaline-reacting compound with the oxime of its alkali salt.

The preparation of the new active substances, starting with the 2-aminobenzimidazolene, is carried out expediently in an inert organic solvent, such as chloroform, dioxane, tetrahydrofurane, in the presence of an acid acceptor, such as triethylamine, or a substance of alkaline reaction, such as sodium carbonate. At temperatures around the freezing point up to room temperature, the 1-alkyleneamino-oxycarbonyl-2-aminobenzimidazole is formed predominantly. The reaction of this compound or of the isomer mixture with chloroformic acid alkyl esters in an inert organic solvent, such as acetone, chloroform, or benzene, in the presence of a basic substance, such as triethylamine or sodium carbonate, leads to 1,3- and 1,2-disubstituted substances.

The derivatives of the general formula (I), trisubstituted in 1-, 2- and 3- position, can be obtained by further reaction of the 1,2-derivatives with chloroformic acid esters or carbamic acid chlorides in an inert solvent and in the presence of an acid acceptor or by reaction with an isocyanate in an inert organic solvent. The new active substances of the general formula I may, if $R_5$ represents hydrogen, be present also in a tautomeric form.

The following illustrate the production of the new benzimidazole carbamates

I 1-isopropylideneamino-oxycarbonyl-2-(methoxycarbonylamino)-benzimidazole 9.6 g (0.05 mole) of 2-methoxycarbonylaminobenzimidazole are admixed in 50 ml of anhydrous chloroform with 11.65 g (0.085 mole) of acetone-oxime-O-carbonyl chloride. Into this suspension are dropped within 30 minutes 8.7 g (0.085 mole) of triethylamine in 25 ml of anhydrous chloroform while stirring. After some time a clear solution is obtained from the suspension. After treatment with active carbon, the product is shaken several times with water. After the drying of the chloroform phase with magnesium sulfate and filtration, the product is concentrated somewhat and the residue stirred into 330 ml of n-heptane. After suction filtering under vacuum, the crystals are dried at room temperature.

The yield: 10.5 g = 72.5% of the theory

M.p. 150° – 151° C

In a similar manner, when using the corresponding starting products, the following compounds can, for example, be produced:

| | Name of compound according to invention | Physical constants |
|---|---|---|
| 1. | 1-Isopropylidenaminooxycarbonyl-2-(etoxycarbonylamino)-benzimidazole | M.P.: 110° C |
| 2. | 1-Isopropylidenaminooxycarbonyl-2-(allyloxycarbonylamino)-5-methylbenzimidazole | M.P.: 180° C |
| 3. | 1-Isopropylidenaminooxycarbonyl-2-(butoxycarbonylamino)-benzimidazole | M.P.: 215° C |
| 4. | 1-Isopropylidenaminooxycarbonyl-2-(allyloxycarbonylamino)-5-chlorbenzimidazole | M.P.: 108 – 110° C |
| 5. | 1-Isopropylidenaminooxycarbonyl-2-(allyloxycarbonylamino)-5-nitrobenzimidazole | M.P.: 156° C |
| 6. | 1-Isopropylidenaminooxycarbonyl-2-(allyloxycarbonylamino)-5-methoxybenzimidazole | M.P.: 99 – 100° C |
| 7. | 1-Isopropylidenaminooxycarbonyl-2-(isopropoxycarbonylamino)-benzimidazole | M.P.: 96 – 98° C |
| 8. | 1-Isopropylidenaminooxycarbonyl-2-(methoxycarbonylamino)-5-chlorbenzimidazole | M.P.: 129 – 130° C |
| 9. | 1-Isopropylidenaminooxycarbonyl-2-(isobutoxycarbonylamino)-benzimidazole | M.P.: >250° C |
| 10. | 1-Isopropylidenaminooxycarbonyl-2-(ethoxycarbonylamino)-5-methylbenzimidazole | M.P.: 114 – 115° C |
| 11. | 1-Isopropylidenaminooxycarbonyl-2-(methoxycarbonylamino)-5-methoxybenzimidazole | M.P.: 130° C |
| 12. | 1-Isopropylidenaminoxycarbonyl-2-(ethoxycarbonylamino)-5-chlorbenzimidazole | M.P.: 129 – 130° C |
| 13. | 1-(Diphenylmethylidenaminoxycarbonyl)-2-(methoxycarbonylamino)-benzimidazole | M.P.: 150 – 151° C |
| 14. | 1-(methylphenylmethylidenaminooxycarbonyl)-2-)methoxycarbonylamino)-benzimidazole | M.P.: 143 – 144° C |
| 15. | 1-(Diphenylmethylidenaminooxycarbonyl)-2-(isopropoxycarbonylamino)-benzimidazole | M.P.: 156 – 157° C |

II 1,3-di-(isopropylideneaminooxycarbonyl)-2-(methoxycarbonylimino)-5-methoxybenzimidazole 11.05 g (0.05 mole) of 5-methoxy-2-(methoxycarbonylamino)-benzimidazole are admixed in 40 ml of anhydrous chloroform with 24 g (0.18 mole) of acetoneoxime-O-carbonyl chloride. At 0° C there are added to this suspension within 5 minutes 12 g (0.12 mole) of triethylamine in 25 ml of anhydrous chloroform while stirring. Then one stirs at −5° C to +5° C until a homogeneous mixture is formed. After shaking out with water four times, the chloroform phase is dried and concentrated after filtration. The oil is taken up in a little ether and caused to crystallize by intensive cooling.

The yield: 12.7 g = 60.6% of the theory
M.p. 168° – 169° C

Similarly, there can be produced:

| Name of compound according to invention | Physical constants |
|---|---|
| 1,3-di-(isopropylideneaminooxycarbonyl)-2-(methoxycarbonylimino)-benzimidazole | M.P.: 132° C |
| 1,3-di-(isopropylideneaminooxycarbonyl)-2-(ethoxycarbonyl-imino)-benzimidazole | M.P.: 130 – 131° C |
| 1,3-di-(isopropylideneaminooxycarbonyl)-2-(allyloxycarbonylimino)-5-methoxybenzimidazole | M.P.: 163 – 164° C |
| 1,3-di-(isopropylideneaminooxycarbonyl)-2-(allyloxycarbonylimino)-5-methylbenzimidazole | M.P.: 184° C |

III 1-isopropylideneaminooxycarbonyl-3-allylcarbamoyl-2-(ethoxycarbonylimino)-benzimidazole 8.0 g (0.0263 mole) of 1-isopropylideneaminooxycarbonyl-2-(ethoxy)-benzimidazole in 100 ml of anhydrous chloroform are stirred at room temperature with 2.3 g (0.0277 mole) of allylisocyanate until a clear or almost clear solution is formed. After filtration, chloroform is evaporated under vacuum and the residue brought to crystallization by taking up in little ether and intensive cooling.

The yield: 9.8 g = 95.8% of the theory
M.p. 196° – 198° C

IV 1-isopropylideneaminooxycarbonyl-3-n-butylcarbamoyl-2-(methoxycarbonylimino)-benzimidazole To a solution of 35.5 g (0.122 mole) of 1-isopropylideneaminooxycarbonyl-2-(methoxycarbonylamino)-benzimidazole in 450 ml of absolute chloroform there is added in drops within 10 minutes at room temperature while stirring a solution of 12.8 g (0.129 mole) of n-butylisocyanate in 50 ml of absolute chloroform. Then 3 ml of triethylamine are added. The reaction mixture is left standing over night and then concentrated under vacuum at 20° C. The oily residue is brought to crystallization with a little ether.

The yield: 35.7 g = 75% of the theory
M.p. 260° C

By this method also the following compounds can be produced:

| Name of compound according to invention | Physical constants |
|---|---|
| 1-isopropylideneaminooxycarbonyl-3-butyl-carbamoyl-2-(methoxycarbonylimino)-benzimidazole | M.P.: >260° C |
| 1-isopropylideneaminooxycarbonyl-3-ethyl-carbamoyl-2-(allyloxycarbonylimino)-4-methylbenzimidazole | M.P.: >260° C |
| 1-isopropylideneaminooxycarbonyl-3-butyl-carbamoyl-2-(allyloxycarbonylimino)-5-methylbenzimidazole | M.P.: 183° C |
| 1-isopropylideneaminooxycarbonyl-3-butyl-carbamoyl-2-(ethoxycarbonylimino)-benzimidazole | M.P.: >250° C |
| 1-isopropylideneaminooxycarbonyl-3-butyl-carbamoyl-2-(allyloxycarbonylimino)-5-chlorobenzimidazole | M.P.: >250° C |

The new compounds are soluble in organic solvents, such as acetone, isophorone, chloroform, dimethylformamide, tetrahydrofurane, dioxane, acetic acid ethyl ester, cyclohexane, and the like.

The starting products for the production of the compounds according to the invention are known in the art or can be produced by known methods.

From the following examples the fungicidal action of the compounds of the invention as compared with known agents will become evident.

Example 1

Cotton seeds disinfected with 50% formulations were seeded in a compost soil infected with Rhizoctonia solani, 150 grains for each concentration. After a cultivation time of two weeks at a temperature of 25° to 27° C, the number of sound cotton seedlings was determined.

| Compounds according to invention | % sound plants from seeding after two weeks cultivation time 2.0 gn active subst./kg seed |
|---|---|
| 1. 1-isopropylideneaminooxycarbonyl-2-(isopropoxycarbonylamino)-benzimidazole | 84.6 |
| 2. 1-isopropylideneaminooxycarbonyl-3-butylcarbamoyl-2-(ethoxycarbonylimino)-benzimidazole | 71.3 |
| 3. 1-isopropylideneaminooxycarbonyl-3-butylcarbamoyl-2-(methoxycarbonylimino)-benzimidazole | 69.3 |
| 4. 1-isopropylidenaminooxycarbonyl-3-allyl-carbamoyl-2-(ethoxycarbonylimino)-benzimidazole | 71.3 |

| Compounds according to invention | % sound plants from seeding after two weeks cultivation time 2.0 gn active subst./kg seed |
| --- | --- |
| 5. 1-isopropylideneaminooxycarbonyl-2-(methoxycarbonylamino)-benzimidazole | 71.3 |
| 6. 1-isopropylideneaminooxycarbonyl-2-(ethoxycarbonylamino)-benzimidazole | 59.3 |
| Reference agents | |
| Methyl-1-(butylcarbamoyl)-2-benzimidazole carbamate | 64.6 |
| N-(trichloromethyl-thio)-cyclohex-4-ene-1, 2-dicarboximide | 50.6 |
| Steamed soil, seed material not heated | 91.3 |
| Infected soil, seed material not heated | 14.5 |

Example 2

Steamed compost soil was inoculated with mycelium of Rhizoctonia solani. After homogeneous mixing of the preparations with the infected soil, the preparations were present as 20% powder products, 25 grains of marrow peas of the variety "Miracle of Kelvedon" per concentration were seeded without a waiting period in clay dishes holding 1 liter of soil. The table shows the number of emerging sound peas, the weight of the fresh plant, and a root analysis after a cultivation time of 19 days at a temperature of 22° to 25° C.

Root analysis:
4 = white roots, without fungus necroses
3 = white roots, slight fungus necroses
2 = brown roots, greater fungus necroses
1 = severe fungus necroses, roots rotted The test results prove the superior effect of the compounds according to the invention against Rhizoctonia solani in comparison with commercial preparations.

Example 3

Steamed compost soil was inoculated with mycelium of *Fusarium oxysporum f. callistephi*. After homogeneous mixing of the preparations with the infected soil, the preparations were present as 20% powder products, 6 seedings per concentration of Callistephus chinensis, Master Aster "Sunray", as host plants were set out. The table shows the number of infected plants after a cultivation time of 4 weeks at a temperature of 22° to 25° C.

| | Compounds according to invention | Mg act. Subst per liter of | No. sound peas after 19 days | Fresh Plant wt. (g) | Root Anal. (1–4) |
| --- | --- | --- | --- | --- | --- |
| 1. | 1-Isopropylidenaminooxycarbonyl-2-(isopropoxycarbonylamino)-benzimidazole | 10 mg<br>20 mg<br>40 mg | 12<br>24<br>24 | 8 g<br>19 g<br>19 g | 3<br>4<br>4 |
| 2. | 1-Isopropylidenaminooxycarbonyl-3-butylcarbamoyl-2-(ethoxycarbonylimino)-benzimidazole | 10 mg<br>20 mg<br>40 mg | 2<br>22<br>24 | —<br>15 g<br>16 g | 1<br>4<br>4 |
| 3. | 1-Isopropylidenaminooxycarbonyl-3-allylcarbamoyl-2-(ethoxycarbonylimino)-benzimidazole | 10 mg<br>20 mg<br>40 mg | 1<br>18<br>25 | —<br>11 g<br>15 g | 1<br>4<br>4 |
| 4. | 1-Isopropylidenaminooxycarbonyl-2-(methoxycarbonylamino)-benzimidazole | 10 mg<br>20 mg<br>40 mg | 16<br>23<br>25 | 11 g<br>15 g<br>17 g | 2<br>3<br>4 |
| 5. | 1-Isopropylidenaminooxycarbonyl-2-(ethoxycarbonylamino)-benzimidazole | 10 mg<br>20 mg<br>40 mg | 12<br>19<br>20 | 10 g<br>16 g<br>16 g | 3<br>4<br>4 |
| 6. | 1-Isopropylidenaminooxycarbonyl-3-butylcarbamoyl-2-(methoxycarbonylimino)-benzimidazole | 10 mg<br>20 mg<br>40 mg | 23<br>24<br>24 | 20 g<br>19 g<br>20 g | 4<br>4<br>4 |
| Reference agents | | | | | |
| 1,4-dichloro-2,5-dimethoxybenzene | | 10 mg<br>20 mg<br>40 mg | 5<br>12<br>17 | 3 g<br>9 g<br>12 g | 1<br>3<br>4 |
| N-(trichlormethylthio)-cyclohex-4-en-1,2-dicarboximide | | 10 mg<br>20 mg<br>40 mg | 2<br>11<br>11 | 1 g<br>6 g<br>6 g | 1<br>1<br>1 |
| Steamed soil | | — | 24 | 13 g | 4 |
| Infected soil | | — | 0 | — | 1 |

| | Compounds according to invention | mg of active subst. per liter of soil | No. of infected plants after 4 weeks |
|---|---|---|---|
| 1. | 1-isopropylideneaminooxycarbonyl-2-(isopropoxycarbonylamino)-benzimidazole | 20 mg | 0 |
| | | 30 mg | 0 |
| 2. | 1-isopropylideneaminooxycarbonyl-2-(methoxycarbonylamino)-benzimidazole | 20 mg | 0 |
| | | 30 mg | 0 |
| 3. | 1-isopropylideneaminooxycarbonyl-2-(ethoxycarbonylamino)-benzimidazole | 20 mg | 0 |
| | | 30 mg | 0 |
| 4. | 1-isopropylideneaminooxycarbonyl-3-butylcarbamoyl-2-(methoxycarbonylimino)-benzimidazole | 20 mg | 0 |
| | | 30 mg | 0 |
| Reference Agent | | | |
| 5. | N-(trichloromethylthio)-cyclohex-4-ene-1,2-dicarboximide | 20 mg | 6 |
| | | 30 mg | 6 |
| | Steamed soil | — | 0 |
| | Untreated soil | — | 6 |

Example 4

The testing of the action against True Mildew (*Erysiphe cichoracearum*) on pumpkin (*Cucurbita pepo var. giromontiina*) was done on young plants with two fully developed foliage leaves. The plants were sprayed dripping wet with the agents on the top and underside of the leaves. One day later the plants were infected with the mildew spores. Seven days later the degree of infection was determined according to the degree of coverage on the top of the leaf with the fungus turf (percent of infection of the leaves).

| Compounds according to invention | % of infection of the leaves after 8 days 45 ppm |
|---|---|
| 1-isopropylideneaminooxycarbonyl-2-(methoxycarbonylamino)-benzimidazole | 0 |
| 1-isopropylideneaminooxycarbonyl-2-(ethoxycarbonylamino)-benzimidazole | 11 |
| Reference agent | |
| (6-(1-methyl-heptyl)-2,4-dinitrophenyl)-crotonate | 100 |
| control (untreated) | 100 |

| | Compounds according to invention | % of infection of the leaves | | | |
|---|---|---|---|---|---|
| | | 250 ppm | 50 ppm | 10 ppm | 2 ppm |
| 1. | 1-isopropylideneaminooxycarbonyl-2-(methoxycarbonylamino)-benzimidazole | 0 | — | 3 | — |
| 2. | 1-isopropylideneaminooxycarbonyl-2-(isoproxycarbonylamino)-benzimidazole | — | 0 | 0 | 10 |
| 3. | 1-isopropylideneaminooxycarbonyl-3-butylcarbamoyl-2-(ethoxycarbonylimino)-benzimidazole | 0 | — | 15 | — |
| Reference agent | | | | | |
| 4. | Methyl-1-(butylcarbamoyl)-2-benzimidazole carbamate | — | 0 | 5 | 70 |
| Control (untreated) | | 100 | | | |

Example 5

Leaf stems of pumpkin plants (*Cucurbita pepo var. griomontiina*) were treated with the compounds as follows. A cotton wad was placed midway on the leaf stem between the stem insertion and the start of the leaf which wad had been imbided with 2 ml of a suspension containing 45 ppm of the compounds to be tested. To prevent evaporation, the wad was wrapped in plastic foil. On the same day the leaves were dusted with the spores of pumpkin mildew (Erysiphe cichoracearum). The evaluation according to the percentage infection of the leaf area with the fungus turf was made 8 days later. The systemic fungicidal effect due to translocation of the compounds of the invention in the plant is demonstrated by the test data listed in the following table.

Example 6

Rice plants were sprayed with the substances to be tested about two weeks after seeding. On the following day the plants were infected artificially with a suspension of about 200,000 spores per ml of *Piricularia oryzae* (rice blast). The infection was carried out by suspending the spores, grown on a synthetic culture medium, in an aqueous solution of 0.05% sodium oleate and 0.2% gelatin and spraying on the treated plants. After keeping the test plants for 5 days in an infection chamber at about 26° C and almost 100% relative humidity, the percentage infection of the leaves was evaluated and set in relation to the infection of the control (relative percent).

| Compounds according to invention | % of infection | | |
|---|---|---|---|
| | 1000 ppm | 200 ppm | 40 ppm |
| 1. 1-isopropylideneaminooxycarbonyl-2-(methoxycarbonylamino)-benzimidazole | 0 | 0 | 0 |
| 2. 1-isopropylideneaminooxycarbonyl-2-butylcarbamoyl-2-(methoxycarbonylimino)-benzimidazole | 0 | 3 | 7 |
| 3. 1-isopropylideneaminooxycarbonyl)-2-(isopropoxycarbonylimino)-benzimidazole | 0 | 0.5 | 11 |
| 4. 1-isopropylideneaminooxycarbonyl)-3-(allylcarbamoyl)-2-ethoxycarbonylimino-benzimidazole | 0 | 4 | 17 |

| Reference agent | 4000 ppm | 2000 ppm | 1000 ppm | 500 ppm |
|---|---|---|---|---|
| 5. N-(trichloro-methyl-thio)-cyclohex-4-ene-1,2-dicarboximide | 0 | 0.5 | 2 | 4 |
| Control (untreated) | | 100 | | |

Example 7

Rice seeds were placed in soil which had been thoroughly mixed with 25 ppm of the compounds to be tested. After about 2 weeks, the rice plants developing in this soil were infected with a suspension of about 200,000 spores per ml of the causative agent of rice blast (Piricularia oryzae) in an aqueous solution of 0.05% sodium oleate and 0.2% gelatin. The plants were then kept 5 days in an infection chamber at 26° C and a relative humidity of almost 100%. After this time the percentage infection of the leaves was evaluated and set in relation to the leaf infection of the control plants (relative percent). From this example can be seen the good systemic effect of the compounds according to the invention on the plant parts above ground when the agents had been worked into the soil.

| Compounds according to invention | % of infection (relative) |
|---|---|
| 1-isopropylideneaminooxycarbonyl-2-(methoxycarbonylamino)-benzimidazole | 4.5 |
| 1-isopropylideneaminooxycarbonyl-3-butylcarbamoyl-2-(methoxycarbonylimino)-benzimidazole | 19 |
| Control (untreated) | 100 (absolute 60%) |

Example 8

Rye seed naturally infected with Fusarium nivale was thoroughly mixed with the substances to be tested. To achieve a homogeneous distribution of the active substance on the grain, the compounds to be tested were provided with the usual additions, such as kaolin, talc, chalk, dye, oil, and the like. The seed material was then put in soil and was exposed to a temperature of 6 to 12° C in an airconditioned chamber. After 4 weeks the percentage infection of the diseased plants was determined.

| Compounds according to invention | % of infection | | | |
|---|---|---|---|---|
| | 10 ppm | 5 ppm | 2 ppm | 1 ppm |
| 1. 1-isopropylideneaminooxycarbonyl-2-(methoxycarbonylamino)-benzimidazole | 0 | 0 | 0 | 3.2 |
| 2. 1-isopropylideneaminooxycarbonyl-2-(ethoxycarbonylamino)-benzimidazole | 0 | 0 | 0.2 | 4 |
| 3. 1-isopropylideneaminooxycarbonyl-3-butylcarbamoyl-2-(methoxycarbonylimino)-benzimidazole | 0 | 0 | 0.2 | 1 |
| 4. 1-isopropylideneaminooxycarbonyl-2-(isopropoxycarbonylamino)-benzimidazole | 0 | 0.2 | 14 | 50 |
| 5. 1-isopropylideneaminooxycarbonyl-2-(methoxycarbonylamino)-5-methoxy-benzimidazole | 0 | 6 | 67 | 98 |
| 6. 1-isopropylideneaminooxycarbonyl-3-butylcarbamoyl-2-(ethoxycarbonylimino)-benzimidazole | 0 | 0 | 0 | 18 |

—Continued

| Compounds according to invention | % of infection | | | |
|---|---|---|---|---|
| | 10 ppm | 5 ppm | 2 ppm | 1 ppm |
| 7. 1-isopropylideneaminooxycarbonyl-3-allylcarbamoyl-2-(ethoxy-carbonylimono)-benzimidazole | 0 | 0 | 0 | 3 |
| Reference agent | 138 ppm | 69 ppm | | 35 ppm |
| 8. methoxyethyl-Hg-silicate | 1 | 8 | | 16 |
| Control (untreated) | | | 100 | |

Example 9

The fungicidal effect of compounds according to the invention against plant-pathogenic fungi was tested on synthetic culture media in Petri dishes, (agar impregnation test). A culture medium consisting of 2% malt extract and 1.5% agar-agar powder was sterilized and thoroughly mixed before solidification with the compounds to be tested, so that the culture medium contained the active substances listed in the table in different quantities of 10, 1, 0.1 and 0.01 ppm. The culture medium was, after its solidification, inoculated with a platinum dropper containing each time about 100 spores of the fungi to be tested. After exposure for 5 to 10 days at 22° C, the diameters of the fungus colonies were measured in mm. The diameter of the colonies on untreated culture media (control) was taken as 100 and set in relation to the diameter of the colonies on the treated culture media (relative percent).

| Compounds according to invention | Diameter of the fungus colonies in mm (Relative percent at control = 100) | | | | | | | | | | | |
|---|---|---|---|---|---|---|---|---|---|---|---|---|
| | Botrytis Cinerea | | | | Fusicladium dendtriticum | | | | Piricularia | | | |
| | 10 ppm | 1 ppm | 0.1 ppm | 0.01 pppm | 10 ppm | 1 ppm | 0.1 ppm | 0.01 ppm | 10 ppm | 1 ppm | 0.1 ppm | 0.01 ppm |
| 1. 1-Isopropylideneaminooxycarbonyl-2-(methoxycarbonylamino)-benzimidazole | — | 0 | 7 | — | — | 0 | 0 | 0 | — | 0 | 67 | — |
| 2. 1-Isopropylideneaminooxycarbonyl-2-(ethoxycarbonylamino)-benzimidazole | — | 0 | 83 | — | | | | | | | | |
| 3. 1,3-Di-(isopropylideneaminooxy-carbonyl-2-(methoxycarbonyl-imino)-benzimidazole | — | 0 | 63 | — | — | 0 | 64 | — | | | | |
| 4. 1-Isopropylideneaminooxycarbonyl-3-butylcarbamoyl-2-(methoxy-carbonylimino)-benzimidazole | — | 0 | 81 | — | — | 0 | 0 | 100 | — | 0 | 100 | — |
| 5. 1-Isopropylideneaminooxycarbonyl-2-(allyloxycarbonylamino)-5-methoxybenzimidazole | — | 0 | 100 | — | — | 0 | 73 | — | | | | |
| 6. 1-Isopropylideneaminooxycarbonyl-2-(isopropoxycarbonylamino)-benzimidazole | — | 0 | 95 | — | — | 0 | 0 | 0 | | | | |
| 7. 1-Isopropylideaminooxycarbonyl-3-butylcarbamoyl-2-(ethoxy-carbonylimino)-benzimidazole | — | 0 | 89 | — | — | 0 | 0 | — | — | 0 | 100 | — |
| 8. 1-Isopropylideneaminooxycarbonyl-3-allycarbamoyl-2-(ethoxy-carbonylimino)-benzimidazole | — | 0 | 100 | — | — | 0 | 73 | — | — | 0 | 30 | 90 |
| 9. 1-Isopropylideneaminooxycarbonyl-3-ethylcarbamoyl-2-(allyloxy-carbonylimino)-5-methyl-benzimidazole | | | | | — | 0 | 100 | — | | | | |
| 10. 1-Isopropylideneaminooxycarbonyl-2-(isobutoxycarbonylamino)-benzimidazole | | | | | — | 0 | 91 | — | | | | |
| 11. 1-Isopropylideneaminooxycarbonyl-2-(ethoxycarbonylamino)-5-methylbenzimidazole | | | | | —0 | 73 | — | | — | 0 | 100 | — |
| 12. 1-Isopropylideneaminooxycarbonyl-2-(methoxycarbonylamino)-5-methoxybenzimidazole | | | | | — | 0 | 91 | — | | | | |
| 13. 1-Isopropylideneaminooxycarbonyl 2-(ethoxycarbonylamino)-5-chlorbenzimidazole | | | | | — | 0 | 82 | — | | | | |
| Reference agent N-(trichloro-methyl-thio)-cyclohex-4-ene-1,2-dicarboximide | 8 | 17 | — | — | 0 | 50 | — | — | 6 | 23 | — | — |
| Control (untreated) | | 100 | | | | 100 | | | | 100 | | |

Example 10

Young pumpkin plants with fully developed cotyledons, grown in normal humus soil, were used for the tests. After the roots had been freed from the adhering soil in water, two plants each were placed in aqueous suspensions of 20 ppm of each of the substances to be tested. The young plants stood in the suspensions only to such a depth that the roots and a piece of the stem, hypocotyl portion, at most 5 mm long were immersed in the liquid. After 7 and 24 hours, respectively, the plants were taken out and the plant parts which had come in contact with the suspensions were rinsed off in water. Then the plants were sterilized externally with a 1% solution of sodium hypochlorite. From the upper end of the about 40 mm long hypocotyl, directly under the insertion of the cotyledons, a piece of stem about 3 mm long was cut out. The stem pieces were placed in sterile Petri dishes with the cut area on a malt extract-agar (2% malt extract and 1.5% agar-agar powder), which had been well mixed before cooling with spores of Botrytis cinerea. Two days after the laying out of the stem pieces, the inhibition coronae, no growth of Botrytis, formed around the stem pieces were determined as to their diameter. The size of the inhibition coronae reflects the velocity of the conductivity and the intensity of the effect.

| Compounds according to invention | Diameters Inhibition coronae in mm after action of 20 ppm suspensions during a period of | |
|---|---|---|
| | 7 hours | 24 hours |
| 1. 1-Isopropylideneaminooxycarbonyl-2-(methoxycarbonylamino)-benzimidazole | 29 | 34 |
| 2. 1-Isopropylideneaminooxycarbonyl-2-(ethoxycarbonylamino)-benzimidazole | 21 | 23 |
| 3. 1,3-Di-(isopropylideneaminooxycarbonyl)-2-(methoxycarbonylimino)-benzimidazole | 19 | 18 |
| 4. 1-Isopropylideneaminooxycarbonyl-3-(butylcarbamoyl)-2-methoxycarbonylimino)-benzimidazole | 24 | 31 |
| 5. 1-Isopropylideneaminooxycarbonyl-2-(isopropoxycarbonylamino)-benzimidazole | 14 | 22 |
| Reference agent | | |
| Methyl-1-(butylcarbamoyl)-2-benzimidazole-carbamate | 13 | 16 |
| Control (untreated) | 0 | 0 |

Example 11

Rye seed naturally infected with *Fusarium nivale* was thoroughly mixed with the substances to be tested. To obtain a homogeneous distribution of the active substance on the grain, the compounds to be tested were provided with the usual additions, such as kaolin, talc, chalk, dye, oil, and the like. Then the seed was put in soil and was exposed to a temperature of 6 to 12° C in an airconditioned chamber. After 4 weeks the percentual infection of the diseased plants was determined.

| Compounds according to invention | % of infection | | |
|---|---|---|---|
| | 2 ppm | 1 ppm | 0.5 ppm |
| 1-(diphenylmethylideneaminooxycarbonyl)-2-(methoxycarbonylamino)-benzimidazole | 0.4 | 3 | 36 |
| 1-(methylphenylmethylideneaminooxycarbonyl)-2-(methoxycarbonylamino)-benzimidazole | 0 | 0 | 16 |
| 1-(diphenylmethylideneaminoxycarbonyl-2-(isopropoxycarbonylamino)-benzimidazole | 0 | 1 | 20 |
| Control (untreated) | | | 100 |

We claim:
1. A compound of the formula:

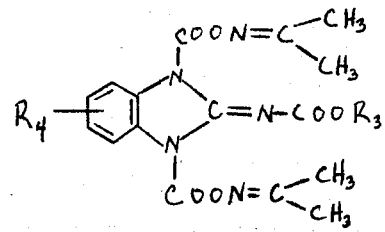

wherein $R_3$ is methyl, ethyl or allyl and $R_4$ is hydrogen, lower alkoxy, lower alkyl halo or nitro.

2. A compound of the formula set forth in claim 1 which is 1,3-di-(isopropylideneaminooxycarbonyl)-2-(methoxycarbonylimino)-5-methoxybenzimidazole.

3. A compound of the formula set forth in claim 1 which is 1,3-di-(isopropylideneaminooxycarbonyl)-2-(methoxycarbonylimino)-benzimidazole.

4. A compound of the formula set forth in claim 1 which is 1,3-di-(isopropylideneaminooxycarbonyl)-2-(ethoxycarbonylimino)-benzimidazole.

5. A compound of the formula set forth in claim 1 which is 1,3-di-(isopropyleneaminooxycarbonyl)-2-(allyloxycarbonylimino)-5-methoxybenzimidazole.

6. A compound of the formula set forth in claim 1 which is 1,3-di-(isopropylideneaminooxycarbonyl)-2-(allyloxycarbonylimino)-5-methylbenzimidazole.

* * * * *